July 5, 1938. J. SINKO 2,122,962
CIGAR LIGHTER IGNITER UNIT
Original Filed May 2, 1936
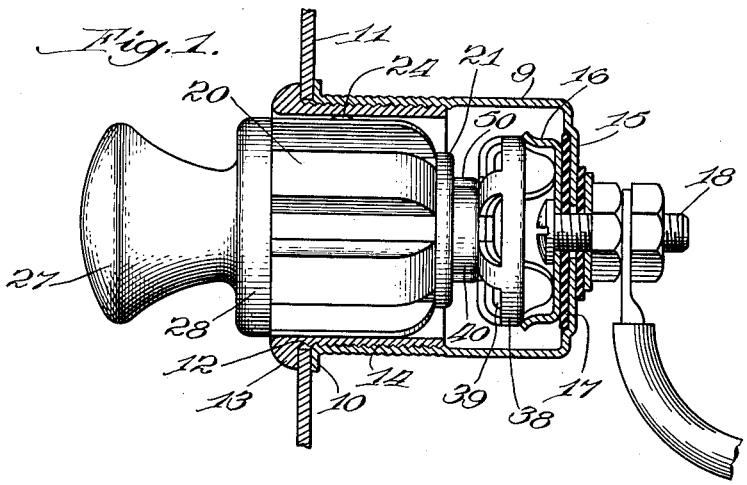
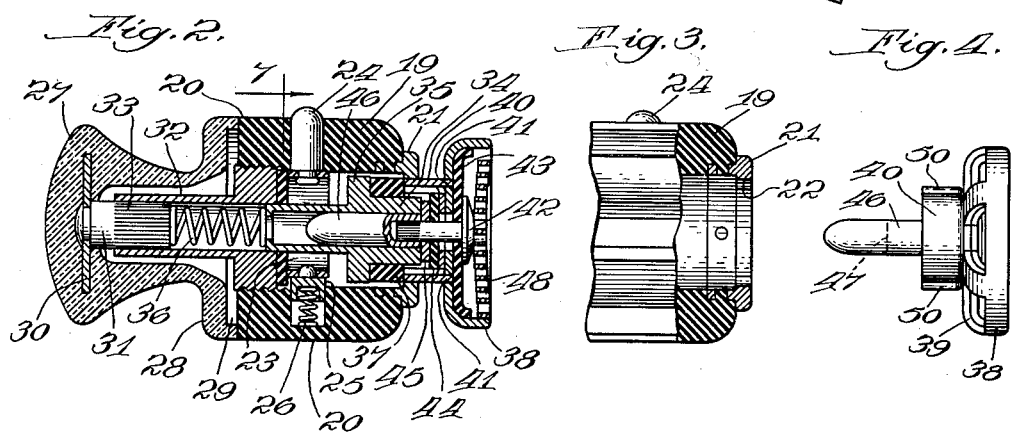
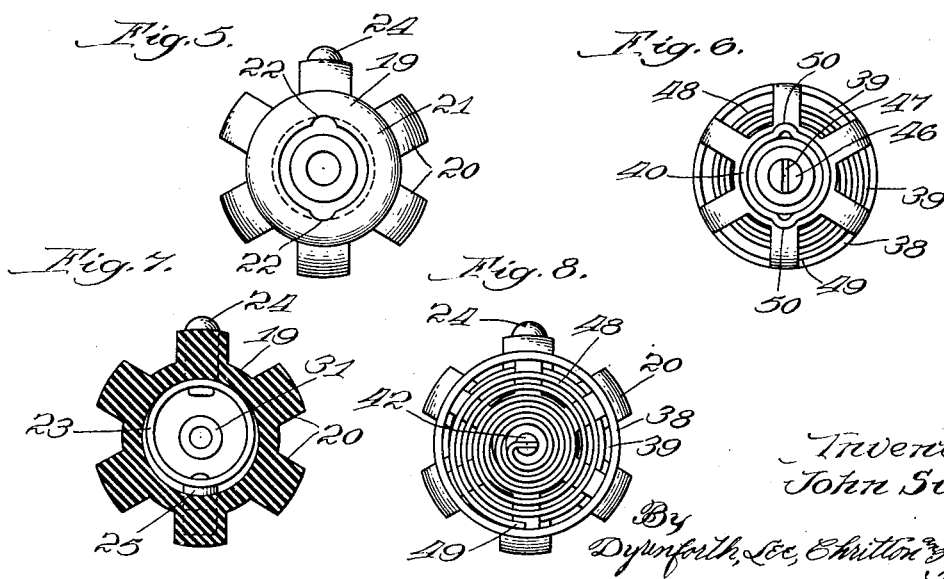
Inventor:
John Sinko.
By Dyrenforth, Lee, Chritton & Wiles
Attys.

Patented July 5, 1938

2,122,962

UNITED STATES PATENT OFFICE 2,122,962

CIGAR LIGHTER IGNITER UNIT

John Sinko, Chicago, Ill.

Original application May 2, 1936, Serial No. 77,581. Divided and this application November 20, 1936, Serial No. 111,942

5 Claims. (Cl. 219—32)

This invention relates to cigar lighters and more particularly to electric lighters adapted for use in automobiles, having a withdrawable igniter plug of the "wireless" type.

A primary object of the invention is to provide an improved replaceable igniter unit which may be readily plucked out of the end of the plug without disassembling the device.

Another object of the invention is to provide an igniter unit which is non-rotatably mounted so that if the operator wishes to twist the plug slightly to make a better contact the unit will not come apart.

Heretofore some of the lighters of this general type have attempted to permit the light to shine back through the body of the plug to show that the device is ready for use. However, this has permitted but such a small amount of light to reach the handle that it is almost impossible to observe it in ordinary daylight. In the present invention ribs are provided on the body member which properly space the withdrawable unit within the socket and preferably the handle flange is merely coextensive with the ribs so that the light may actually be observed around the flange.

The present application is a division of my application Serial No. 77,581, filed May 2, 1936, covering a Cigar lighter.

The invention is illustrated in a preferred embodiment in the accompanying drawing, in which—

Figure 1 is a side elevational view of a withdrawable plug embodying the invention, the socket member being shown in section; Fig. 2, a horizontal sectional view of the plug; Fig. 3, a broken sectional view showing the end of the body member with its molded-end guide ferrule; Fig. 4, a side elevational view of the igniter unit; Fig. 5, an end elevational view of the plug with the igniter unit removed; Fig. 6, an end elevational view of the rear side of the igniter unit; Fig. 7, a sectional view taken as indicated at line 7 of Fig. 2; and Fig. 8, an end elevational view of the plug.

In the embodiment illustrated, a socket member 9 may be in the form of a cup made of sheet metal or the like, and preferably is provided at its open end with an outwardly extending flange 10 adapted to abut against a perforated panel 11 adapted to receive a bushing 12. Preferably, the bushing is provided with an outwardly extending flange 13 and has a threaded sleeve portion 14 adapted to engage the rear threaded portion of the socket and hold it in position.

The closed end portion 15 of the socket-member serves to support a base terminal 16 which may be in the form of a spider-like member insulated from the socket by means of washers 17 and connected to a suitable source of electrical supply by means of a bolt 18. Thus, it will be understood that the bushing 12 may form one terminal for the withdrawable plug and the second terminal 16 may be fixed to and insulated from the front end of the socket.

The withdrawable plug is shown with an insulating body 19, preferably of bakelite or the like and provided on its outer side with outwardly extending ribs 20. Preferably, the front end of the body member is provided with a guide ferrule 21 which is molded into the body itself. The guide ferrule is provided with guide slots 22 to prevent rotation of the heating element as will be described below.

As best shown in Figs. 2 and 7, the body member is provided with an internal contacting ring 23 provided with an outwardly extending fixed contacting pin 24, which is adapted to engage one of the socket terminals 12. The opposite side of the ring has a small presser sleeve 25, disposed within one of the ribs 20 and has a compression spring 26 which urges the ring 23 laterally to provide a yielding contact between the pin 24 and the socket member. The withdrawable plug has a knob 27 which preferably is made of a plastic molding material and is translucent or transparent in its finished state. The knob is shown with a flange 28 coextensive with the ribs 20 and preferably has an annular groove 29 to receive light, shining back between the ribs, and diffuses the same throughout the flange. By making the flange coextensive with the ribs it has been found that the light is readily apparent around the flange itself and may be seen in daylight without difficulty. Preferably, the handle has a brass plate 30 provided with a forwardly extending knurled stem 31 upon which is mounted a hollow screw plug 32 which is pressed over the knurling indicated at 33. The front end of the plug makes a screw-threaded connection with the body member 19 and, as will be readily understood, the member 30 is molded in the knob. This construction provides space within the hollow handle and prevents excessive heating.

As shown in Fig. 2, a hollow supporting member 34 is slidably mounted within the body member and has a flange 35 which is adapted to make electrical contact with the ring 23. This member is urged forwardly by means of a compression spring 36 provided within the plug member 32.

An insulating washer 37 limits the forward movement of the member.

The igniting unit is shown with a spider-like contacting cup 38 which has openings 39 between its arms in register with the openings between the ribs. A rearwardly extending guide cup 40 is fastened back-to-back with the cup member 38 and preferably has tongues 41 extending into perforations in the cup 38 to prevent turning thereon. The cups are held together by means of a headed stem member 42, which is held insulated from the cups by means of insulating washers 43 and 44. A brass washer 45 may be slipped over the knurled end of the stem and the assembly secured together by pressing a hollow pin 46 firmly over the knurled end of the stem. Preferably, the rear end portion of the stem 46 is pointed and slotted as indicated at 47 to facilitate its insertion into the member 34. The front end of the stem member 42 supports the heating element 48 which has one end connected to the cup 38, as indicated at 49 and the other end is fixed to the slotted end of the member 42. As shown in Figs. 4 and 6, the guide cup 40 has outwardly extending ribs 50 which register with the slots 22 provided in the ferrule 21. This prevents the heating unit from rotating with respect to the body member.

In case a heating unit burns out it is merely necessary to grasp the cup 38 and pull it out of the member 34 and replace it with a new unit. To operate the device the handle 27 is depressed which will cause the supporting member 35 to contact the ring 23 and complete the circuit through the heating coil. When the coil reaches incandescence, light will shine back between and around the ribs 20 and the operator may then withdraw the plug bodily to light a cigar.

The foregoing detailed description has been given for clearness of understanding only, and no unnecessary limitations should be understood therefrom, but the appended claims should be construed as broadly as permissible in view of the prior art.

What I claim as new and desire to secure by Letters Patent, is:

1. In a device of the character set forth, a heating unit adapted to be frictionally mounted on an igniter plug body comprising: a contacting cup; a rearwardly extending guide-sleeve mounted on said cup; a stem projecting rearwardly through said cup and sleeve and insulated therefrom; a hollow pin mounted on said stem and having its rear end portion slotted; and a heating coil disposed in said cup with one end secured to the front of said stem and having the other end in electrical contact with the cup.

2. In a device of the character set forth, a heating unit adapted to be frictionally mounted on an igniter plug body comprising: a contacting cup; a guide cup mounted back-to-back on said contacting cup; a headed stem-member projecting rearwardly through said cups and insulated therefrom by means of insulating washers, said stem having its rear end knurled; a heating coil disposed within said cup with one end connected to said stem and the other connected to said cup; and a rearwardly extending hollow pin mounted on the knurled portion of said stem, said pin making a pressed fit with said stem and serving to hold the cups together.

3. A device as specified in claim 2, in which one of the cups has a projection extending into a socket in the companion cup to prevent rotation therebetween, and the guide cup is provided with longitudinal guide ribs to prevent its rotation with respect to said igniter plug body.

4. In a device of the character set forth, a heating unit adapted to be removably secured to a longitudinally grooved igniter plug body comprising: a contacting cup adapted to form an electrical terminal; a rearwardly extending guide member secured to said cup and shaped to make slidable, non-rotatable, engagement with the grooves in said plug body; a rearwardly projecting stem mounted on and insulated from said cup, said stem being adapted to contact with a terminal on said plug body; and a heating coil within said cup having one end mounted on the front end of the stem and the other end in electrical contact with said cup.

5. A heating unit for a plug body having at its front end a centrally disposed contact, comprising; a contacting cup adapted to form an electrical terminal; a rearwardly extending guide sleeve having a front detent engaging said cup to prevent rotation with respect thereto and having a longitudinal rib to prevent rotation with respect to said plug body; a centrally disposed terminal insulated from and mounted to secure said sleeve and cup together, said terminal being adapted to be supported by and make frictional contact with the body contact; and a heating coil within said cup having one end connected to said cup and the other end connected to the central terminal.

JOHN SINKO.